US011628568B2

(12) United States Patent
Li et al.

(10) Patent No.: US 11,628,568 B2
(45) Date of Patent: Apr. 18, 2023

(54) COOPERATIVE ROBOTIC ARM SYSTEM AND HOMING METHOD THEREOF

(71) Applicant: INDUSTRIAL TECHNOLOGY RESEARCH INSTITUTE, Hsinchu (TW)

(72) Inventors: Huan-Sheng Li, Toufen (TW); Chien-Yu Wu, Kouhu Township (TW); Han-Chun Hsueh, Taipei (TW); Shu Huang, Zhudong Township (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 340 days.

(21) Appl. No.: 17/135,797

(22) Filed: Dec. 28, 2020

(65) Prior Publication Data

US 2022/0203533 A1 Jun. 30, 2022

(51) Int. Cl.
*G05D 1/02* (2020.01)
*B25J 9/16* (2006.01)
*B25J 9/00* (2006.01)

(52) U.S. Cl.
CPC ........... *B25J 9/1666* (2013.01); *B25J 9/0084* (2013.01)

(58) Field of Classification Search
CPC ...... B25J 9/1676; B25J 9/1651; B25J 9/1666; G05D 1/0214; G05D 1/0219;
(Continued)

(56) References Cited

U.S. PATENT DOCUMENTS 6,678,582 B2 1/2004 Waled
8,315,738 B2 11/2012 Chang et al.
(Continued)

FOREIGN PATENT DOCUMENTS

CN 103466458 B 2/2015
CN 105479490 A 4/2016
(Continued)

OTHER PUBLICATIONS

Cheng, "Programming Advanced Control Functions for Enhanced Intelligence of Industrial Robots," Proceedings of the 8th World Congress on Intelligent Control and Automation, Jul. 6-9, 2010, Jinan, China, IEEE Xplore, pp. 4486-4490.
(Continued)

*Primary Examiner* — Dalena Tran
(74) *Attorney, Agent, or Firm* — Birch, Stewart, Kolasch & Birch, LLP

(57) ABSTRACT

A cooperative robotic arm system includes a first robotic arm, a second robotic arm and a controller. The first robotic arm has first working vector. The second robotic arm has second working vector. The controller is configured to: (1) control the first robotic arm and the second robotic arm to stop moving; (2) determine whether a first projection vector of the first working vector projected on a first coordinate axis and a second working vector projected on the first coordinate axis overlaps; (3) when they overlap, determine whether a third projection vector of the first working vector projected on a second coordinate axis and a fourth projection vector of the second working vector projected on the second coordinate axis overlap; and, (4). when they do no overlap, control a controlled-to-moved one of the first robotic arm and the second robotic arm to move along a reset path.

18 Claims, 10 Drawing Sheets

100
110
120
130
W1
W2
V1
V2
r1
r2
x1
y1
z1
x2
y2
z2

(58) Field of Classification Search

CPC ........ G05D 1/0253; G05B 2219/40478; G05B 2219/49137; G05B 2219/49138

USPC ...... 700/245, 255, 178, 250; 901/14, 30, 36; 414/217

See application file for complete search history.

(56) References Cited

U.S. PATENT DOCUMENTS

| | | | | |
|---|---|---|---|---|
| 9,827,675 | B2 | 11/2017 | Moridaira | |
| 10,131,053 | B1 * | 11/2018 | Sampedro | B25J 9/1666 |
| 10,500,726 | B2 * | 12/2019 | Gildert | B25J 9/1664 |
| 10,676,022 | B2 * | 6/2020 | Zevenbergen | G01C 21/20 |
| 10,766,140 | B2 * | 9/2020 | Krasny | B25J 9/1676 |
| 11,235,465 | B2 * | 2/2022 | Sorin | B25J 9/1671 |
| 2010/0145515 | A1 | 6/2010 | Nakanishi et al. | |
| 2018/0361578 | A1 | 12/2018 | Muneto | |

FOREIGN PATENT DOCUMENTS

| | | | |
|---|---|---|---|
| CN | 109890572 | A | 6/2019 |
| CN | 111203916 | A | 5/2020 |
| JP | 2013-255939 | A | 12/2013 |
| TW | I368727 | B | 7/2012 |
| TW | I615691 | B | 2/2018 |

OTHER PUBLICATIONS

Jin et al., "Adaptive Dynamic Collision Checking Based Industrial Robot Motion Planning Algorithms." Proceedings of the 31st Chinese Control Conference, Jul. 25-27, 2012, Hefei, China, pp. 4450-4455, with an English abstract.

Kong et al., "An Efficient Collision Detection Algorithm for the Dual-Robot Coordination System," 2018 IEEE 3rd Advanced Information Technology, Electronic and Automation Control Conference (IAEAC 2018), IEEE Xplore, 2018, pp. 1533-1537.

Kong et al., "Collision Detection Algorithm for Dual-Robot System," Proceedings of 2014 IEEE International Conference on Mechatronics and Automation, Tianjin, China, Aug. 3-6, 2014, IEEE Xplore. pp. 2083-2088.

Min et al., "Collision Detection and Identification on Robot Manipulators Based on Vibration Analysis," Sensors, vol. 19, Mar. 3, 2019, pp. 1-17.

Wenzhong et al., "Sensorless Robot Collision Detection Based on Optimized Velocity Deviation," IEEE, 2017, pp. 6200-6204.

* cited by examiner

COOPERATIVE ROBOTIC ARM SYSTEM AND HOMING METHOD THEREOF

TECHNICAL FIELD

The disclosure relates in general to a cooperative robotic arm system and a homing method thereof.

BACKGROUND

Nowadays, there are more and more situations where multiple robotic arms cooperate in production lines. When there is a sudden stop or unexpected movement or speed reduction (for example, malfunction, abnormality, etc.) of one robotic arm, it is probable that the coordinated robotic arm collides the abnormal robotic arm under no timely response during the homing process. Therefore, how to prevent collisions, for of the coordinated (normal operation) robotic arm, during the homing process is a topic worthy of research.

SUMMARY

According to an embodiment, a homing method for a cooperative robotic arm system is provided. The homing method further includes: controlling a first robotic arm and a second robotic arm to stop moving, wherein the first robotic arm has a first working vector and the second robotic arm has a second working vector; determining whether a first projection vector of the first working vector projected on a first coordinate axis and a second projection vector of the second working vector projected on the first coordinate axis overlap; determining whether a third projection vector of the first working vector projected on a second coordinate axis and a fourth projection of the second working vector projected on the second coordinate axis overlap when the first projection vector and the second projection vector overlap; and controlling a first controlled-to-moved one of the first robotic arm and the second robotic arm to move along a first reset path when the third projection vector and the fourth projection vector do not overlap, wherein the first reset path does not pass through a working point of a stopped one of the first robotic arm and the second robotic arm.

According to another embodiment, a cooperative robotic arm system is provided. The cooperative robotic arm system includes a first robotic arm, a second robotic arm and a controller. The first robotic arm has a first working vector. The second robotic arm has a second working vector. The controller is configured to: control the first robotic arm and the second robotic arm to stop moving; determine whether a first projection vector of the first working vector projected on a first coordinate axis and a second projection vector of the second working vector projected on the first coordinate axis overlap; determine whether a third projection vector of the first working vector projected on a second coordinate axis and a fourth projection of the second working vector projected on the second coordinate axis overlap when the first projection vector and the second projection vector overlap; and control a first controlled-to-moved one of the first robotic arm and the second robotic arm to move along a first reset path when the third projection vector and the fourth projection vector do not overlap, wherein the first reset path does not pass through a working point of a stopped one of the first robotic arm and the second robotic arm.

The above and other aspects of the disclosure will become better understood with regard to the following detailed description of the preferred but non-limiting embodiment (s). The following description is made with reference to the accompanying drawings.

Figure 1:
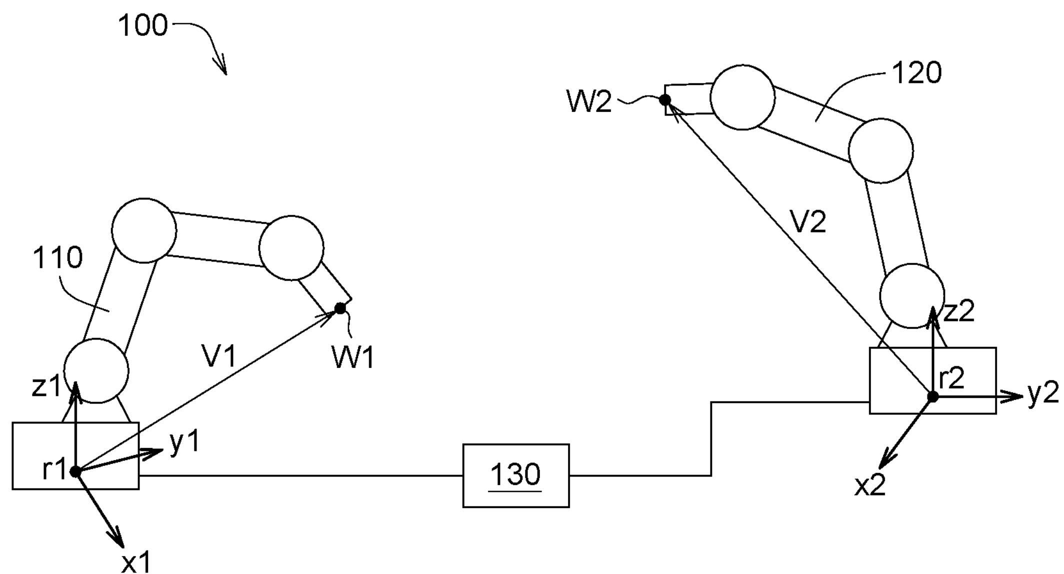
FIG. 1 shows a schematic diagram of a collaborative robotic arm system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
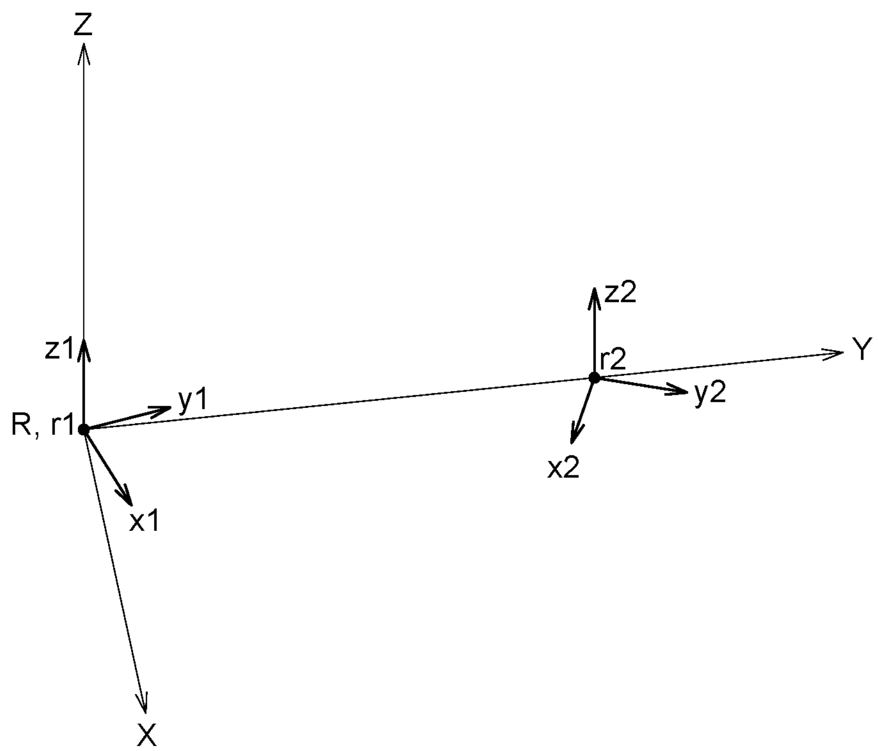
FIG. 2 shows a schematic diagram of the common coordinate system XYZ of the collaborative robotic arm system of FIG. 1A.
Figure 3A:
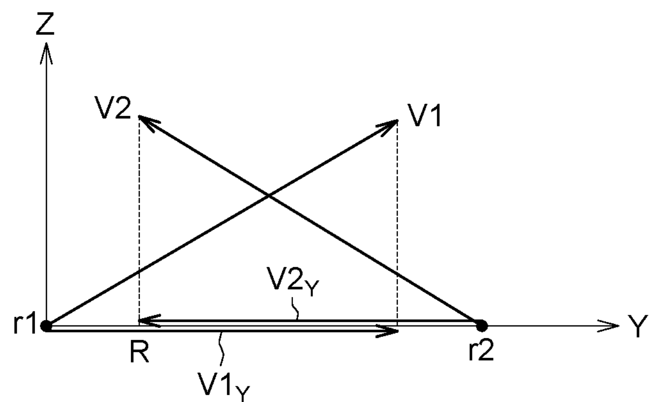
FIG. 3A shows a schematic diagram of the overlapping first projection vector $V1_Y$ and the second projection vector $V2_Y$ of the collaborative robotic arm system.
Figure 3B:
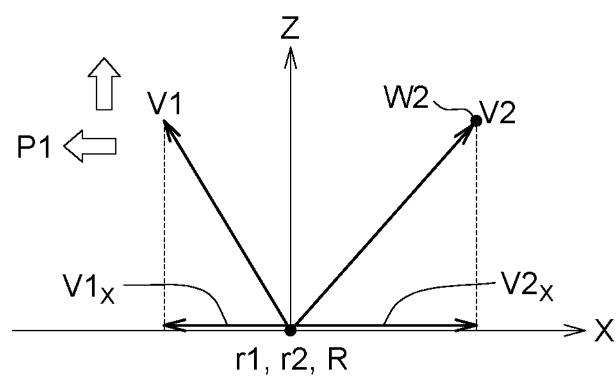
FIG. 3B shows a schematic diagram of the third projection vector $V1_X$ and the fourth projection vector $V2_X$ of the collaborative robotic arm system of FIG. 3A.
Figure 3C:
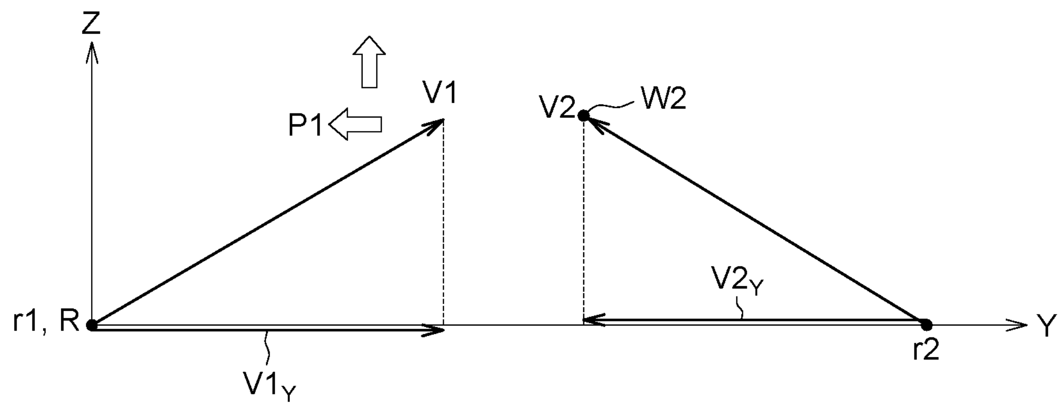
FIG. 3C is a schematic diagram that shows the first projection vector $V1_Y$ and the second projection vector $V2_Y$ of the collaborative robotic arm system do not overlap according to another embodiment.
Figure 3D:
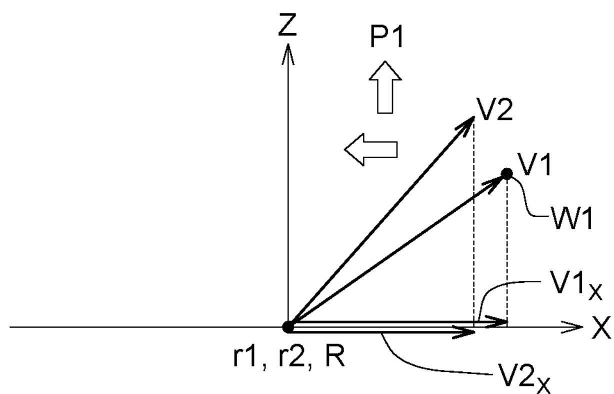
FIG. 3D shows a schematic diagram of the overlapping third projection vector $V1_X$ and the fourth projection vector $V2_X$ according to another embodiment.

Referring to FIGS. 1, 2 and 3A to 3D, FIG. 1 shows a schematic diagram of a collaborative robotic arm system 100 according to an embodiment of the present disclosure, and FIG. 2 shows a schematic diagram of the common coordinate system XYZ of the collaborative robotic arm system 100 of FIG. 1A, FIG. 3A shows a schematic diagram of the overlapping first projection vector $V\mathbf{1}_Y$ and the second projection vector $V\mathbf{2}_Y$ of the collaborative robotic arm system 100, FIG. 3B shows a schematic diagram of the third projection vector $V\mathbf{1}_X$ and the fourth projection vector $V\mathbf{2}_X$ of the collaborative robotic arm system 100 of FIG. 3A, FIG. 3C is a schematic diagram that shows the first projection vector $V\mathbf{1}_Y$ and the second projection vector $V\mathbf{2}_Y$ of the collaborative robotic arm system 100 do not overlap according to another embodiment, and FIG. 3D shows a schematic diagram of the overlapping third projection vector $V\mathbf{1}_X$ and the fourth projection vector $V\mathbf{2}_X$ according to another embodiment.

The embodiment of the disclosure proposes a collaborative robotic arm system and a homing method (or reset/recovery method, that is, makes a robotic arm return back/to an initial or an original position of the robotic arm) thereof. The collaborative robotic arm system includes a plurality of robotic arms and a controller, wherein the controller is configured to: (1) control all robotic arms to stop moving, wherein each robotic arm has a working vector; (2). determine whether any two of the projection vectors of the working vectors projected on a coordinate axis are overlapped with each other; (3). when any two of the projection vectors overlap each other, control at least one controlled-to-moved one of the robotic arms to move along a reset path (or reset path), wherein the reset path does not pass through the stopped one of the robotic arms, the "the stopped one" is one of the robotic arms, for example, a malfunction one or a collided one, and "controlled-to-moved one" are the others of the robotic arms.

Multiple robotic arms of the collaborative robotic arm system 100 could jointly deal with (for example, process, transport, clamp, etc.) an object.

The collaborative robotic arm system 100 includes a first robotic arm 110, a second robotic arm 120 and a controller 130. The controller 130 is configured to: (1) control the first robotic arm 110 and the second robotic arm 120 to stop moving, wherein the first robotic arm 110 has a first working vector V1 and the second robotic arm 120 has a second working vector V2; (2). determine whether the first projection vector $V\mathbf{1}_Y$ of the first working vector V1 projected on the first coordinate axis (e.g., Y axis) and the second projection vector $V\mathbf{2}_Y$ of the second working vector V2 projected on the first coordinate axis overlap; (3). when the first projection vector $V\mathbf{1}_Y$ and the second projection vector $V\mathbf{2}_Y$ overlap (as shown in FIG. 3A), determine whether the third projection vector $V\mathbf{1}_X$ of the first working vector V1 projected on the second coordinate axis (for example, the X axis) and the fourth projection vector $V\mathbf{2}_X$ of the working vector V2 projected on the second coordinate axis overlaps; (4). when the third projection vector $V\mathbf{1}_X$ and the fourth projection vector $V\mathbf{2}_X$ do not overlap (for example, as shown in FIG. 3B), select one of the first robotic arm 110 and the second robotic arm 120 to act as a controlled-to-moved one, and controls the controlled-to-moved one to move along the first reset path P1, wherein the first reset path P1 does not pass through working point of a stopped one of the first robotic arm 110 and the second robotic arms 120. As a result, through the aforementioned homing method, the cooperative robotic arm system 100 could be quickly home and ensure that no collision occurs during the homing process.

As shown in FIG. 2, before obtaining the first projection vector $V\mathbf{1}_Y$, the second projection vector $V\mathbf{2}_Y$, the third projection vector $V\mathbf{1}_X$ and the fourth projection vector $V\mathbf{2}_X$, the controller 130 makes the first working vector V1 and the second working vector is referenced to the same coordinate system, for example, the common coordinate system XYZ. As a result, the projection vectors all are referenced to the same coordinate system, so that the controller 130 could calculate the reset path more quickly and accurately. The embodiment of the present disclosure does not limit the manner in which the controller 130 calculates or determines the reset path. The aforementioned common coordinate system X-Y-Z includes a first coordinate axis Y, a second coordinate axis X and a third coordinate axis Z that are perpendicular to each other.

The following describes how to determine the common coordinate system X-Y-Z. As shown in FIGS. 1 and 2, the first working vector V1 is referenced to (or relative to) the first robotic arm coordinate system x1-y1-z1, and the second working vector V2 is referenced to (or relative to) the second robotic arm coordinate system x2-y2-z2, wherein the third coordinate axis z1 of the first robotic arm coordinate system x1-y1-z1 and the third coordinate axis z2 of the second robotic arm coordinate system x2-y2-z2 are substantially parallel and face the same direction, for example, parallel and upward. The first working vector V1 is a vector from the origin r1 of the first robotic arm coordinate system x1-y1-z1 to the working point W1, wherein the working point W1 is, for example, the end point of the first robotic arm 110, the origin of the flange surface and/or the reference point of tool head, etc. The second working vector V2 is a vector from the origin r2 of the second robotic arm coordinate system x2-y2-z2 to the working point W2, wherein the working point W2 is, for example, the end point of the first robotic arm 110, the origin of the flange surface and/or the reference point of tool head, etc.

The controller 130 is further configured to define the common coordinate system XYZ, wherein the common coordinate system XYZ has the following characteristics: (1). The first coordinate axis Y of the common coordinate system XYZ passes through the origin r1 of the first robotic coordinate system x1-y1-z1 and the origin r2 of the second robotic coordinate system x2-y2-z2; (2). the third coordinate axis Z of the common coordinate system XYZ, the third coordinate axis z1 of the first robotic arm coordinate system x1-y1-z1 and the third coordinate axis z2 of the second robotic arm coordinate system x2-y2-z2 are approximately parallel and facing the same direction; and (3). the origin r1 of the first robotic arm coordinate system x1-y1-z1 and the origin R of the common coordinate system XYZ coincide.

The embodiment of the present disclosure does not limit that the first coordinate axis Y of the common coordinate system XYZ have to pass through the origin r1 of the first robotic arm coordinate system x1-y1-z1 and the origin r2 of the second robotic arm coordinate system x2-y2-z2. In another embodiment, the origin R of the common coordinate system XYZ could also be staggered from the origin r1 of the first robotic arm coordinate system x1-y1-z1 and the origin r2 of the second robotic arm coordinate system x2-y2-z2, that is, do not coincide.

The controller 130 could use any known coordinate conversion mathematical method to obtain conversion relationship between the first robotic arm coordinate system x1-y1-z1 and the common coordinate system XYZ, and conversion relationship of the second robotic arm coordinate system x2-y2-z2 and the common coordinate system XYZ. Through the conversion relationships, the controller 130 could convert the first working vector V1 is referenced to the common coordinate system XYZ from the first robotic arm coordinate system x1-y1-z1, and convert the second working vector V2 to the common coordinate system XYZ from the second robotic arm coordinate system x2-y2-z2. The controller 130 is, for example, a physical circuit formed by a semiconductor manufacturing process, such as a semiconductor chip, a semiconductor package, etc. The controller 130 could receive all the signals of the robotic arm, and obtain the current (or the latest) position of the robotic arm, control the movement of the robotic arm and obtain the reset path based on the signals.

The aforementioned "stopped one" is, for example, a faulty one of the first robotic arm 110 and the second robotic arm 120. For example, the controller 130 is further configured to: (1). determine whether the first robotic arm 110 or the second robotic arm 120 fails (or malfunctions); (2). when the first robotic arm 110 or the second robotic arm 120 fails, control the controlled-to-moved one to move along the first reset path P1. The controlled-to-moved one could be selected from a robotic arm other than the faulty one.

In another embodiment, several robotic arms have collided or will collide, and the controller 130 is further configured to: (1) determine whether the first robotic arm 110 and the second robotic arm 120 have occurred or will collide; (2). when the first robotic arm 110 and the second robotic arm 120 have collided or will collide, select one of the first robotic arm 110 and the second robotic arm 120 as the controlled-to-moved one; and, (3). control the controlled-to-moved one to move along the first reset path P1. In addition, when the controller 130 detects that any one of the robotic arms fails, has collided or will collide, controls all the robotic arms to stop moving to avoid more serious damage to the robotic arms, and then controls the controlled-to-moved one to move along the first reset path P1.

As shown in FIG. 3B, when the second robotic arm 120 (not shown in FIG. 3B) is the stopped one, the controller 130 controls the first robotic arm 110 (not shown in FIG. 3B) to move along the first reset path P1, wherein the first reset path P1, for example, moves away from or approaches the second robotic arm 120. For example, the first reset path P1 is a path that is parallel to the second coordinate axis (e.g., X axis) and away from the second robotic arm 120, or is a path that is parallel to the third coordinate axis (e.g., Z axis) and away from the second robotic arm 120. However, as long as the first reset path P1 of the first robotic arm 110 does not pass the working point W2 of the second robotic arm 120, the first reset path P1 could also be a path that is parallel to the second coordinate axis (e.g., the X axis) or the third coordinate axis (e.g., Z axis) and approach the second robotic arm 120. "P1" in FIG. 3B shows two arrows in different directions, which respectively represent two different directions of reset paths. Arrows in other figures have the same meaning if being drawn in the same style, and the similarities are not repeated.

In an embodiment, when the "controlled-to-moved one" moves away from the "stopped one" along the first coordinate axis, the second coordinate axis or the third coordinate axis, safe distance between the "controlled-to-moved one" and the "stopped one" is enlarged, so that "controlled-to-moved one" and the "stopped one" are in a safer situation, and then the controller 130 controls the "controlled-to-moved one" to return to its initial (or original) position. In detail, before the "controlled-to-moved one" returns to its initial position, the controller 130 makes the "controlled-to-moved one" and the "stopped one" be in the safe distance, and thus the "controlled-to-moved one" will not collide with the "stopped one" during the "controlled-to-moved one" returning to itself initial position, so that the "controlled-to-moved one" could safely return to its initial position.

The projection vectors of the first robotic arm 110 and the second robotic arm 120 of other embodiments are described below.

In another embodiment, as shown in FIG. 3C, the first projection vector $V1_Y$ and the second projection vector $V2_Y$ do not overlap. The controller 130 is configured to: when the first projection vector $V1_Y$ and the second projection vector $V2_Y$ do not overlap, control the controlled-to-moved one of the first robotic arm 110 (not shown in FIG. 3B) and the second robotic arm 120 (not shown in FIG. 3B) to move along the first reset path P1. For example, when the second robotic arm 120 is a stopped one, the controller 130 controls the first robotic arm 110 to move along the first reset path P1, for example, along −Y axis or +Z axis, as two different arrow directions shown as P1 in FIG. 3C. However, as long as the first reset path P1 does not pass through the working point W2 of the second robotic arm 120, the first reset path P1 could also move along +Y axis or −Z axis.

In another embodiment, as shown in FIG. 3D, the third projection vector $V1_X$ overlaps the fourth projection vector $V2_X$. The controller 130 is configured to: when the third projection vector $V1_X$ and the fourth projection vector $V2_X$ overlap, control the controlled-to-moved one of the first robotic arm 110 (not shown in FIG. 3D) and the second robotic arm 120 (not shown in FIG. 3D) to move along the first reset path P1. For example, when the first robotic arm 110 is the stopped one, the controller 130 controls the second robotic arm 120 to move along the first reset path P1, for example, along −X axis or +Z axis, as two different arrow directions shown as P1 in FIG. 3D. However, as long as the first reset path P1 does not pass through the working point W1 of the first robotic arm 110, the first reset path P1 also could move along +X axis or the −Z axis.

Figure 4:
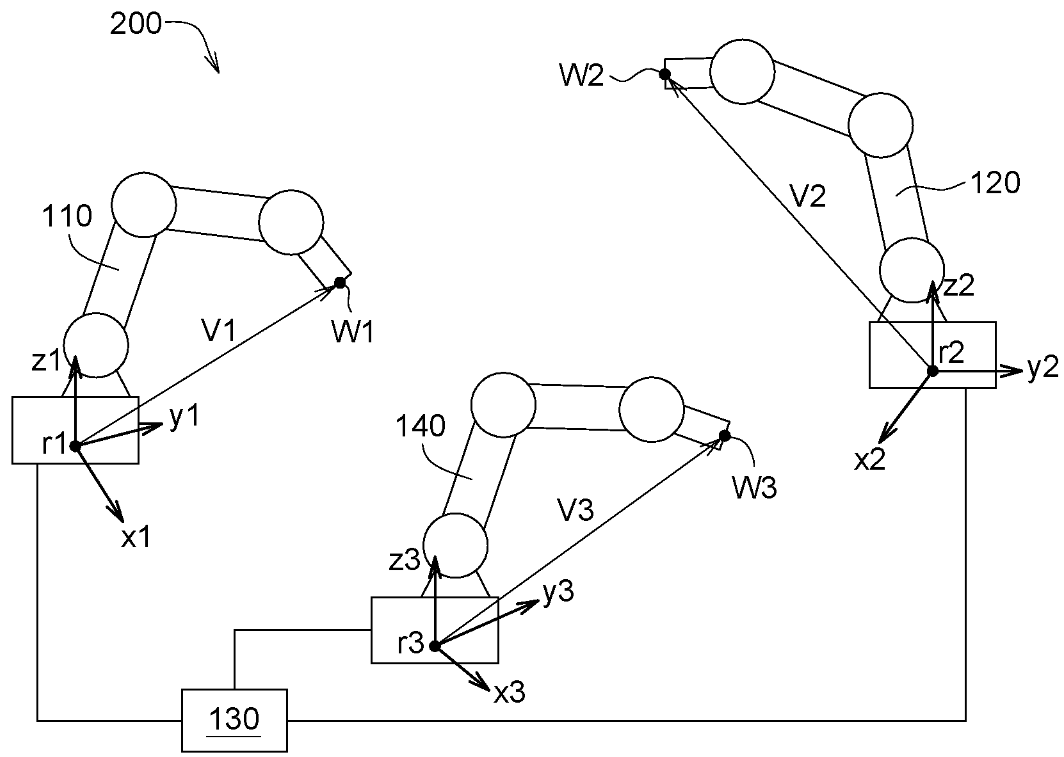
FIG. 4 shows a schematic diagram of a collaborative robotic arm system according to an embodiment of the present disclosure.
Figure 5:
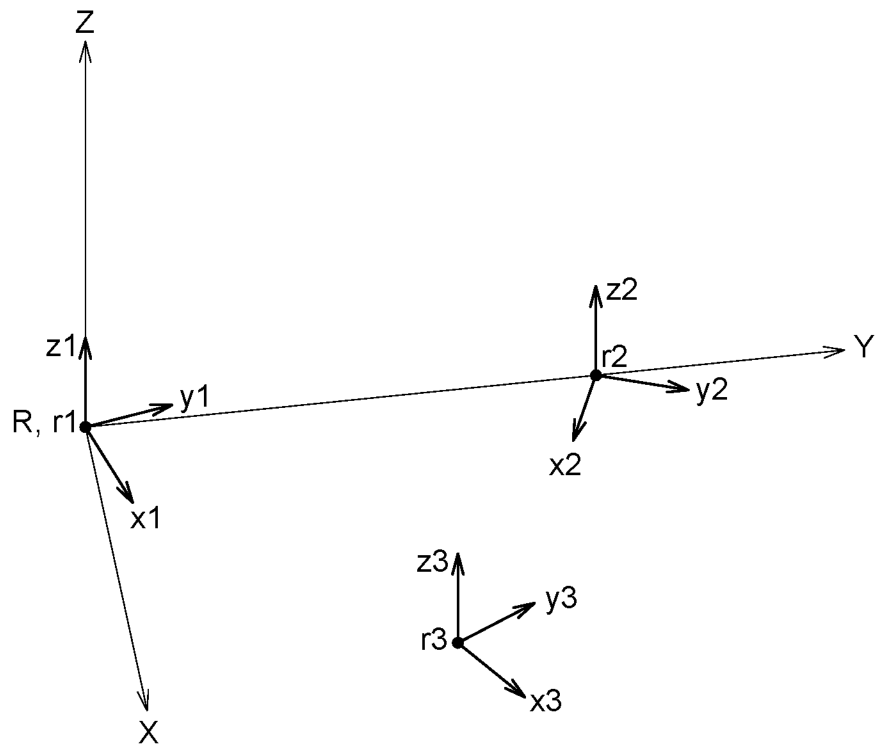
FIG. 5 shows a schematic diagram of the common coordinate system XYZ of the collaborative robotic arm system of FIG. 4.
Figure 6A:
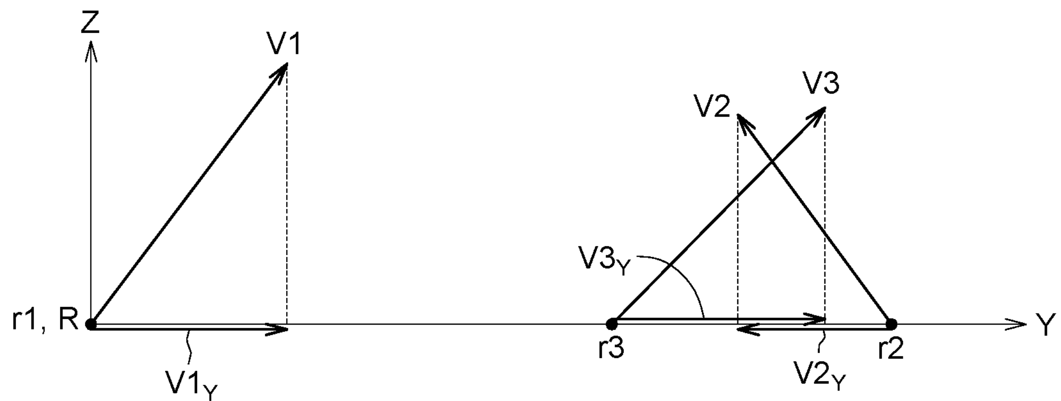
FIG. 6A shows a schematic diagram of any two of the first projection vector $V1_Y$, the second projection vector $V2_Y$ and the fifth projection vector $V3_Y$ of the cooperative robotic arm system overlapping.
Figure 6B:
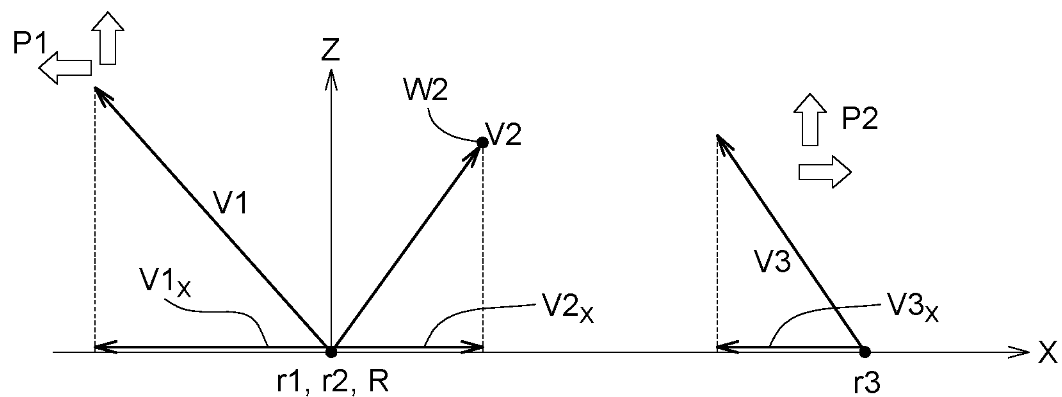
FIG. 6B shows a schematic diagram of the third projection vector $V1_X$, the fourth projection vector $V2_X$ and a sixth projection vector $V3_X$ of the collaborative robotic arm system of FIG. 6A.
Figure 6C:
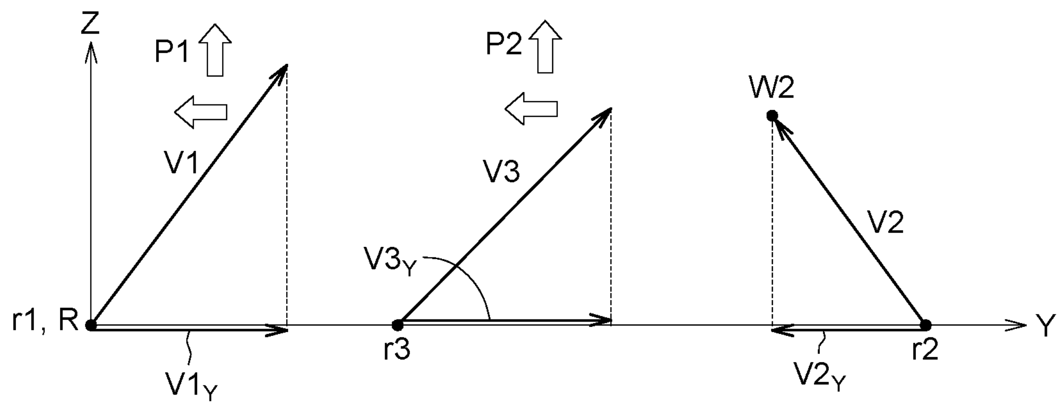
FIG. 6C shows the first projection vector $V1_Y$, the second projection vector $V2_Y$ and the fifth projection vector $V3_Y$ not overlapping in another embodiment.
Figure 6D:
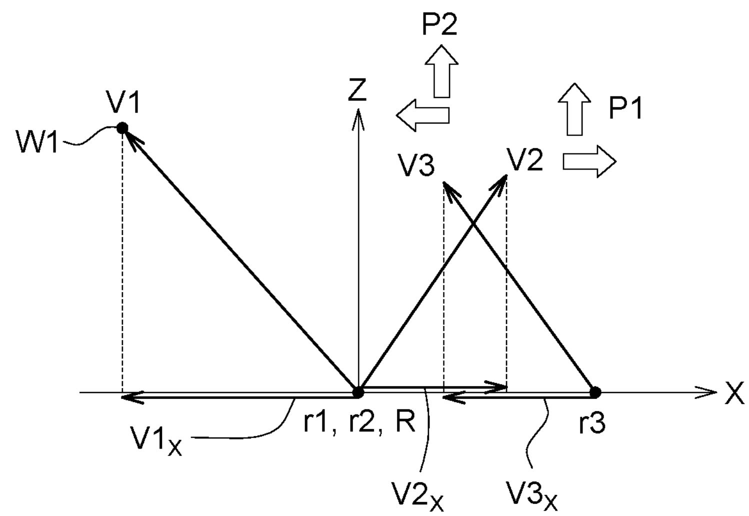
FIG. 6D shows a schematic diagram of the fourth projection vector $V2_X$ and the sixth projection vector $V3_X$ of the collaborative robotic arm system overlapping.
Figure 6E:
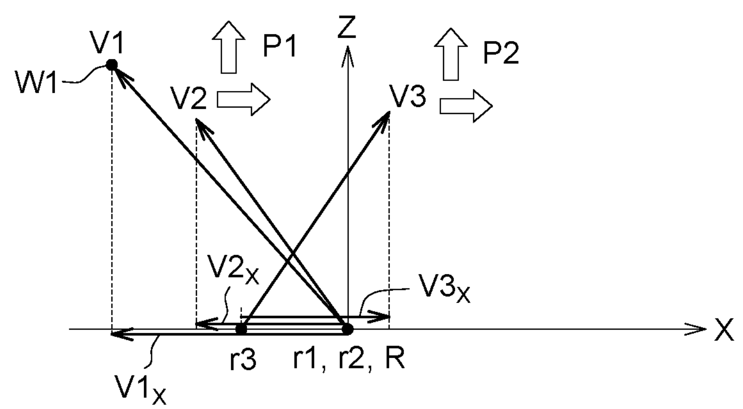
FIG. 6E shows a schematic diagram of the third projection vectors $V1x$, the fourth projection vector $V2_X$ and the sixth projection vector $V3_X$ of the collaborative robotic arm system overlapping.

Referring to FIGS. 4, 5 and 6A to 6E, FIG. 4 shows a schematic diagram of a collaborative robotic arm system 200 according to an embodiment of the present disclosure, and FIG. 5 shows a schematic diagram of the common coordinate system XYZ of the collaborative robotic arm system 200 of FIG. 4, FIG. 6A shows a schematic diagram of any two of the first projection vector $V1_Y$, the second projection vector $V2_Y$ and the fifth projection vector $V3_Y$ of the cooperative robotic arm system 200 overlapping, and FIG. 6B shows a schematic diagram of the third projection vector $V1_X$, the fourth projection vector $V2_X$ and a sixth projection vector $V3_X$ of the collaborative robotic arm system 200 of FIG. 6A, FIG. 6C shows the first projection vector $V1_Y$, the second projection vector $V2_Y$ and the fifth projection vector $V3_Y$ not overlapping in another embodiment, FIG. 6D shows a schematic diagram of the fourth projection vector $V2_X$ and the sixth projection vector $V3_X$ of the collaborative robotic arm system 200 overlapping, and FIG. 6E shows a schematic diagram of the third projection vectors $V1_X$, the fourth projection vector $V2_X$ and the sixth projection vector $V3_X$ of the collaborative robotic arm system 200 overlapping.

The collaborative robotic arm system 200 includes the first robotic arm 110, the second robotic arm 120, the controller 130 and a third robotic arm 140. The controller 130 is configured to: (1) control the first robotic arm 110, the second robotic arm 120 and the third robotic arm 140 to stop moving, wherein the first robotic arm 110 has a first working vector V1 and the second robotic arm 120 has The second working vector V2, and the third robotic arm 140 has a third working vector V3; (2). determine whether the first projection vector $V1_Y$, the second projection vector $V2_Y$ and the fifth projection vector $V3_Y$ of the third working vector V3 projected on the first coordinate axis overlap; (3). when any two of the first projection vector $V1_Y$, the second projection vector $V2_Y$ and the fifth projection vector $V3_Y$ overlap (as shown in FIG. 6A, in this case, the second projection vector $V2_Y$ and the fifth projection vector $V3_Y$ overlap each other), determine whether the third projection vector $V1_X$, the fourth projection vector $V2_X$ and the sixth projection vector $V3_X$ of the third working vector V3 projected on the second coordinate axis overlap each other; (4). when the third projection vector $V1_X$, the fourth projection vector $V2_X$ and the sixth projection vector $V3_X$ do not overlap each other (as shown in FIG. 6B, in this case, the third projection vector $V1_X$ and the fourth projection vector $V2_X$ are not overlap), select one of the first robotic arm 110, the second robotic arm 120 and the third robotic arm 140 as the "first controlled-to-moved one", control the first controlled-to-moved one to move along the first reset path P1, wherein the first reset path P1 does not pass through the working point of the stopped one of the first robotic arm 110, the second robotic arm 120 and the third robotic arm 140, select one of the first robotic arm 110, the second robotic arm 120 and the third robotic arm 140 as the "second controlled-to-moved one", and control the second controlled-to-moved one to move along the second reset path P2, wherein the second reset path P2 does not pass through the working point of the stopped one of the first robotic arm 110, the second robotic arm 120 and the third robotic arm 140. As a result, by the aforementioned homing method, the cooperative robotic arm system 200 could quickly home and ensure that no collision occurs during the homing process.

As shown in FIG. 5, before obtaining the first projection vector $V1_Y$, the second projection vector $V2_Y$, the third projection vector $V1_X$, the fourth projection vector $V2_X$, the fifth projection vector $V3_Y$ and the sixth projection vector $V3_X$, the controller 130 makes the first working vector V1, the second working vector V2 and the third working vector V3 are referenced to the same coordinate system, such as the common coordinate system XYZ. As a result, the projection vectors all are referenced to the same coordinate system, so that the controller 130 calculates the reset path faster and more accurately. The embodiment of the present disclosure does not limit the manner in which the controller 130 calculates or determines the reset path. The aforementioned common coordinate system X-Y-Z includes the first coordinate axis Y, the second coordinate axis X, and the third coordinate axis Z that are perpendicular to each other.

As shown in FIGS. 4 and 5, the first working vector V1 is referenced to (or relative to) the first robotic arm coordinate system x1-y1-z1, and the second working vector V2 is referenced to (or relative to) the second first robotic arm coordinate system x2-y2-z2, and the third working vector V3 is referenced to (or relative to) the third robotic arm coordinate system x3-y3-z3, wherein the coordinate axis z1 of the first robotic arm coordinate system x1-y1-z1, the coordinate axis z2 of the second robotic arm coordinate system x2-y2-z2 and the coordinate axis z3 of the third robotic arm coordinate system x3-y3-z3 are substantially parallel and oriented in the same direction, for example, parallel upward. The third working vector V3 is the vector from the origin r3 of the third robotic arm coordinate system x3-y3-z3 to the working point W3, wherein the working point W3 is, for example, the end point of the third robotic arm 140, the origin of the flange surface and/or the reference point of tool head, etc.

In the present embodiment, as shown in FIG. 5, the first coordinate axis Y of the common coordinate system XYZ passes through the origin r1 of the first robotic arm coordinate system x1-y1-z1 and the origin r2 of the second robotic arm coordinate system x2-y2-z2. In another embodiment, the first coordinate axis Y of the common coordinate system X-Y-Z could pass through the origin r2 of the second robotic arm coordinate system x2-y2-z2 and the origin r3 of the third robotic arm coordinate system x3-y3-z3. In other embodiments, the first coordinate axis Y of the common coordinate system X-Y-Z could pass through the origin r1 of the first robotic arm coordinate system x1-y1-z1 and the origin r3 of the third robotic arm coordinate system x3-y3-z3. In another embodiment, the origin R of the common coordinate system XYZ could be located within a triangle area formed by the origin r1 of the first robotic arm coordinate system x1-y1-z1, the origin r2 of the second robotic arm coordinate system x2-y2-z2 and the origin r3 of the three-manipulator coordinate system x3-y3-z3, that is, the origin R of the common coordinate system XYZ is staggered with the origin r1, the origin r2 and the origin r3, namely do not overlap.

As shown in FIG. 6B, when the second robotic arm 120 is the stopped one, the controller 130 controls the first robotic arm 110 (the first controlled-to-moved one, not shown in FIG. 6B) to move along the first reset path P1, for example, along −X axis or +Z axis, and controls the third robotic arm 140 (the second controlled-to-moved one, not shown in FIG. 6B) to move along the second reset path P2, for example, along +X axis or +Z axis, just like the two different arrow directions shown as P1 and the two different arrow directions shown as P2 in in FIG. 6B. However, as long as the first reset path P1 does not pass through the working point W2 of the second working vector V2, the first reset path P1 also could be the path along +X axis or −Z axis, and the second reset path P2 also could be the path along −X axis or −Z axis. In another embodiment, the third robotic arm 140 could be used as the first controlled-to-moved one, and the first robotic arm 110 could be used as the second controlled-to-moved one.

The following describes the projection vectors of the first robotic arm 110, the second robotic arm 120 and the third robotic arm 140 in other embodiments.

In another embodiment, as shown in FIG. 6C, the first projection vector $V1_Y$, the second projection vector $V2_Y$ and the fifth projection vector $V3_Y$ do not overlap. The controller 130 is configured to: when the first projection vector $V1_Y$, the second projection vector $V2_Y$ and the fifth projection vector $V3_Y$ do not overlap, select one of the first robotic arm 110, the second robotic arm 120 and the third robotic arm 140 as the first controlled-to-moved one, control the first controlled-to-moved one to move along the first reset path P1, selects one of the first robotic arm 110, the second robotic arm 120 and the third robotic arm 140 as the second controlled-to-moved one, and control the second controlled-to-moved one to move along the second reset path P2. For example, as shown in FIG. 6C, when the second robotic arm 120 is the stopped one, the controller 130 controls the first robotic arm 110 to move along the first reset path P1, for example, along −Y axis or +Z axis, and controls the third robotic arm 140 to move along the second reset path P2, for example, along −Y axis or +Z axis, as the two different arrow directions of P1 and the two different arrow directions P2 shown in FIG. 6C. However, as long as the first reset path P1 does not pass through the working point W2 of the second working vector V2, the first reset path P1 also could be the path along +Y axis or −Z axis, and the second reset path P2 also could be the path along +Y axis or −Z axis. In another embodiment, the third robotic arm 140 could be used as the first controlled-to-moved one, and the first robotic arm 110 could be used as the second controlled-to-moved one.

In another embodiment, as shown in FIG. 6D, the fourth projection vector $V2_X$ and the sixth projection vector $V3x$ overlap. When the first robotic arm 110 (not shown in FIG. 6D) is the stopped one, the controller 130 controls the second robotic arm 120 (the first controlled-to-moved one, not shown in FIG. 6D) to move along the first reset path P1, for example, along +X axis or +Z axis, and controls the third robotic arm 140 (the second controlled-to-moved one, not shown in FIG. 6D) to move along the second reset path P2, for example, along −X axis or +Z axis. However, as long as the first reset path P1 does not pass through the working point W1 of the first working vector V1, the first reset path P1 also could be the path along −X axis or −Z axis, and the second reset path P2 also could be the path along +X axis or −Z axis. In another embodiment, the third robotic arm 140 could be used as the first controlled-to-moved one, and the second robotic arm 120 could be used as the second controlled-to-moved one.

In another embodiment, as shown in FIG. 6E, the third projection vector $V1_X$, the fourth projection vector $V2_X$ and the sixth projection vector $V3_X$ overlap each other. When the first robotic arm 110 is the stopped one, the controller 130 controls the second robotic arm 120 (the first controlled-to-moved one, not shown in FIG. 6E) to move along the first reset path P1, for example, along +X axis or +Z axis, and controls the third robotic arm 140 (the second controlled-to-moved one, not shown in FIG. 6E) to move along the second reset path P2, for example, along +X axis or +Z axis. However, as long as the first reset path P1 does not pass through the working point W1 of the first working vector V1, the first reset path P1 also could be the path along the −X axis or the −Z axis, and the second reset path P2 also could be the path along −X axis or −Z axis. In another embodiment, the third robotic arm 140 could be used as the first controlled-to-moved one, and the second robotic arm 120 could be used as the second controlled-to-moved one.

Figure 7:
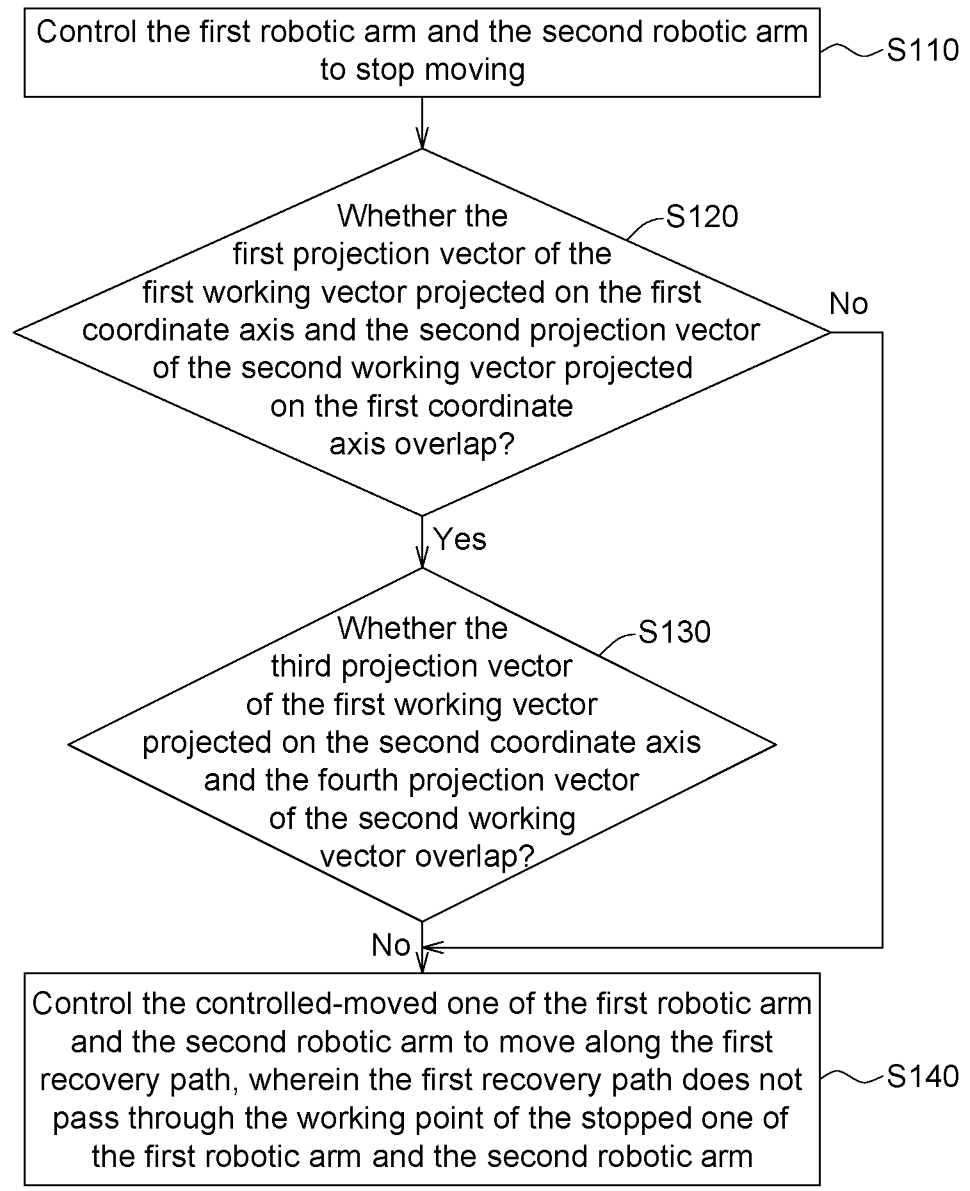
FIG. 7 shows a flowchart of the homing method of the robotic arm system in FIG. 1.

Referring to FIG. 7, FIG. 7 shows a flowchart of the homing method of the robotic arm system 100 in FIG. 1.

In step S110, the controller 130 controls the first robotic arm 110 and the second robotic arm 120 to stop moving, wherein the first robotic arm 110 has a first working vector V1 and the second robotic arm 120 has a second working vector V2.

In step S120, the controller 130 determines whether the first projection vector $V1_Y$ of the first working vector V1 projected on the first coordinate axis and the second projection vector $V2_Y$ of the second working vector V2 projected on the first coordinate axis overlap, wherein the first coordinate axis is, for example, an axis of the common coordinate system XYZ. When the first projection vector $V1_Y$ and the second projection vector $V2_Y$ do not overlap (as shown in FIG. 3C), the process proceeds to step S140. When the first projection vector $V1_Y$ and the second projection vector $V2_Y$ overlap (as shown in FIG. 3A), the process proceeds to step S130.

Then, the controller 130 could determine the overlap situation of the first working vector V1 and the second working vector V2 on the second coordinate axis to determine the reset path. Further description is submitted below.

In step S130, when the first projection vector $V1_Y$ and the second projection vector $V2_Y$ overlap, the controller 130 determines whether the third projection vector $V1_X$ of the first working vector V1 projected on the second coordinate axis and the fourth projection vector $V2_X$ of the second working vector V2 overlap. When the third projection vector $V1_X$ and the fourth projection vector $V2_X$ do not overlap (as shown in FIGS. 3B and 3D), the process proceeds to step S140.

In step S140, when the third projection vector $V1_X$ and the fourth projection vector $V2_X$ do not overlap, the controller 130 controls the controlled-to-moved one of the first robotic arm 110 and the second robotic arm 120 to move along the first reset path P1, wherein the first reset path P1 does not pass through the working point of the stopped one of the first robotic arm 110 and the second robotic arm 120. As long as the first reset path P1 does not pass through the working point of the stopped one of the first robotic arm 110 and the second robotic arm 120, the first reset path P1 could be far away from or close to the stop.

Figure 8:
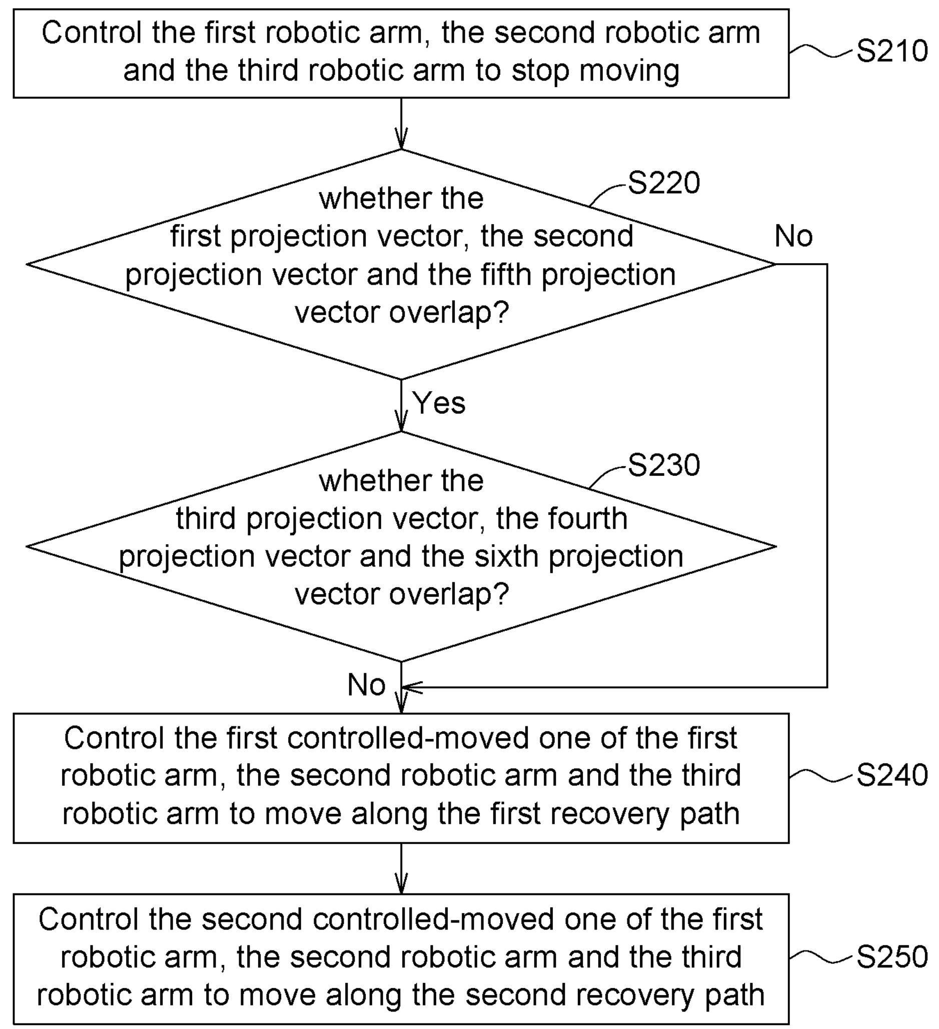
FIG. 8 shows a flowchart of the homing method of the cooperative robotic arm system in FIG. 4.

Referring to FIG. 8, FIG. 8 shows a flowchart of the homing method of the cooperative robotic arm system 200 in FIG. 4.

In step S210, the controller 130 controls the first robotic arm 110, the second robotic arm 120 and the third robotic arm 140 to stop moving, wherein the first robotic arm 110 has the first working vector V1 and a second robotic arm 120 has a second working vector V2, and the third robotic arm 140 has a third working vector V3.

In step S220, the controller 130 determines whether the first projection vector $V1_Y$ of the first working vector V1 projected on the first coordinate axis, the second projection vector $V2_Y$ of the second working vector V2 projected on the first coordinate axis and the fifth projection vector $V3_Y$ of the third working vector V3 projected on the first coordinate axis overlap, wherein the first coordinate axis is, for example, one axis of the common coordinate system XYZ. When the first projection vector $V1_Y$, the second projection vector $V2_Y$ and the fifth projection vector $V3_Y$ do not overlap (as shown in FIG. 6C), the process proceeds to step S240. When the first projection vector $V1_Y$, the second projection vector $V2_Y$ and the fifth projection vector $V3_Y$ overlap (as shown in FIG. 6A), the process proceeds to step S230.

Then, the controller 130 could determine the overlap situation of the first working vector V1, the second working vector V2 and the third working vector V3 on the second coordinate axis to determine the first and second reset paths. Further description is submitted below.

In step S230, when the first projection vector $V1_Y$, the second projection vector $V2_Y$ and the fifth projection vector $V3_Y$ overlap, the controller 130 determines whether the third projection vector $V1_X$ of the first working vector V1 projected on the second coordinate axis, the fourth projection vector $V2x$ of the second working vector V2 projected on the second coordinate axis and the sixth projection vector $V3_X$ of the third working vector V3 projected on the second coordinate axis overlap. When the third projection vector $V1_X$, the fourth projection vector $V2_X$ and the sixth projection vector $V3_X$ do not overlap (as shown in FIGS. 6B, 6D, and 6E), the process proceeds to step S240.

In step S240, when the third projection vector $V1_X$, the fourth projection vector $V2_X$ and the sixth projection vector $V3_X$ do not overlap, the controller 130 controls the first controlled-to-moved one of the first robotic arm 110, the second robotic arm 120 and the third robotic arm 140 to move along the first reset path P1, where the first reset path P1 does not pass through the working point of the stopped one of the first robotic arm 110, the second robotic arm 120 and the third robotic arm 140. As long as the first reset path P1 does not pass through the working point of the stopped one of the first robotic arm 110, the second robotic arm 120 and the third robotic arm 140, the first reset path P1 could be far away or close to the stopped one.

In step S250, the controller 130 controls the second controlled-to-moved one of the first robotic arm 110, the second robotic arm 120 and the third robotic arm 140 to move along the second reset path P2, wherein the second reset path P2 does not pass through the working points of the stopped one of the first robotic arm 110, the second robotic arm 120 and the third robotic arm 140. As long as the second reset path P2 does not pass through the working point of the stopper of the first robotic arm 110, the second robotic arm 120, and the third robotic arm 140 the second reset path P2 could be far away or close to the stopper.

A homing method for the robotic arm (making a robotic arm return back/to an initial or an original position of the robotic arm) according to another embodiment of the present disclosure is described as follow.

In an embodiment, as shown in FIG. 6A, taking the second robotic arm 120 (not marked in FIG. 6A) as the "stopped one" for an example, the controller 130 determines the common coordinate system XYZ according to the origin r1 of the first robotic arm coordinate system x1-y1-z1 and the origin r2 of the second robotic arm coordinate system x2-y2-z2. Since the first working vector V1 of the first robotic arm 110 do not overlap with the second working vector V2 of the second robotic arm 120 and the third working vector V3 of the third robotic arm 140, the controller 130 could use the first robotic arm 110 as the "controlled-to-moved one" and use the aforementioned method to determine the "reset path" of the "controlled-to-moved one", and control the "controlled-to-moved one" to home first. Then, the controller 130 resets the common coordinate system. For example, the controller 130 determines the common coordinate system XYZ according to the origin r2 of the second robotic arm coordinate system x2-y2-z2 and the origin r3 of the third robotic arm coordinate system x3-y3-z3, and determines the reset path of the "controlled-to-moved one" and controls the "controlled-to-moved one" to home first using the aforementioned method.

Figure 9:
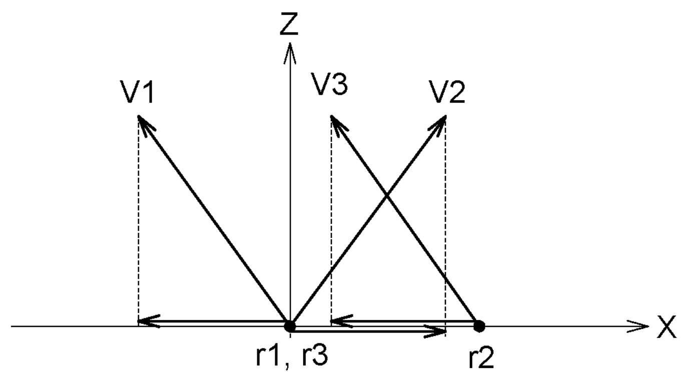
FIG. 9 shows a schematic diagram of a collaborative robotic arm system according to another embodiment of the present disclosure.

In another embodiment, when the first working vector V1 of the first robotic arm 110 overlaps the second working vector V2 of the second robotic arm 120 and the third working vector V3 of the third robotic arm 140 of FIG. 6A, the controller 130 could determine the relative relationship of the robotic arms from another plane. In detail, as shown in FIG. 9, as viewed from the XZ plane, the first working vector V1 of the first robotic arm 110 does not overlap the second working vector V2 of the second robotic arm 120 and the third working vector V3 of the third robotic arm 140. Thus, the controller 130 could use the first robotic arm 110 as the "controlled-to-moved one", determine the reset path of the "controlled-to-moved one" and control the "controlled-to-moved one" to home first using the aforementioned method. Then, the controller 130 resets the common coordinate system. For example, the controller 130 determines the common coordinate system XYZ according to the origin r2 of the second robotic arm coordinate system x2-y2-z2 and the origin r3 of the third robotic arm coordinate system x3-y3-z3, and determines the reset path of the "controlled-to-moved one" and controls the "controlled-to-moved one" to home first using the aforementioned method.

Figure 10:
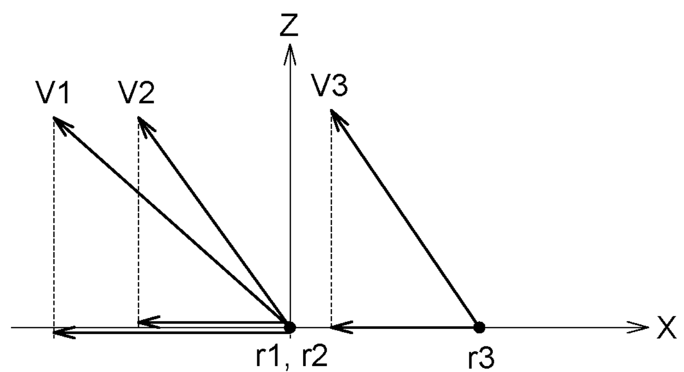
FIG. 10 shows a schematic diagram of the relative relationship of the first robotic arm, the second robotic arm and the third robotic arm according to another embodiment of the present disclosure.

Referring to FIG. 10, FIG. 10 shows a schematic diagram of the relative relationship of the first robotic arm 110, the second robotic arm 120 and the third robotic arm 140 according to another embodiment of the present disclosure. Taking the second robotic arm 120 (not shown in FIG. 10) as the "stopped one" as an example, the controller 130 determines the common coordinate system XYZ according to the origin r1 of the first robotic arm coordinate system x1-y1-z1 and the origin r2 of the second robotic arm coordinate system x2-y2-z2. Since the third working vector V3 of the third robotic arm 130 does not overlap the first working vector V1 of the first robotic arm 110 (not shown in FIG. 10 and the second working vector V2 of the second robotic arm 120, the controller 130 could use the third robotic arm 140 (not shown in FIG. 10) as the "controlled-to-moved one", determine the reset path of the "controlled-to-moved one" and control the "controlled-to-moved one" to home first using the aforementioned method. Then, the controller 130 could not reset the common coordinate system, and the controller 130 uses the first robotic arm 110 as the "controlled-to-moved one", determines the reset path of the "controlled-to-moved one" and controls the "controlled-to-moved one" to home first using the aforementioned method.

In another embodiment, as shown in FIG. 6E, taking the second robotic arm 120 (not shown in FIG. 6E) as the "stopped one" for an example, the controller 130 determines the common coordinate system XYZ according to the origin r1 of the first robotic arm coordinate system x1-y1-z1 and the origin r2 of the second robotic arm coordinate system x2-y2-z2. In the present embodiment, the controller 130 uses the first robotic arm 110 as the "controlled-to-moved one", determines the reset path of the "controlled-to-moved one" and controls the "controlled-to-moved one" to home first using the aforementioned method. Then, the controller 130 could reset the common coordinate system. For example, the controller 130 determines the common coordinate system XYZ according to the origin r2 of the second robotic arm coordinate system x2-y2-z2 and the origin r3 of the third robotic arm coordinate system x3-y3-z3, determines the reset path of the "controlled-to-moved one" (the third robotic arm 140) and controls the "controlled-to-moved one" to home first using the aforementioned method.

Figure 11:
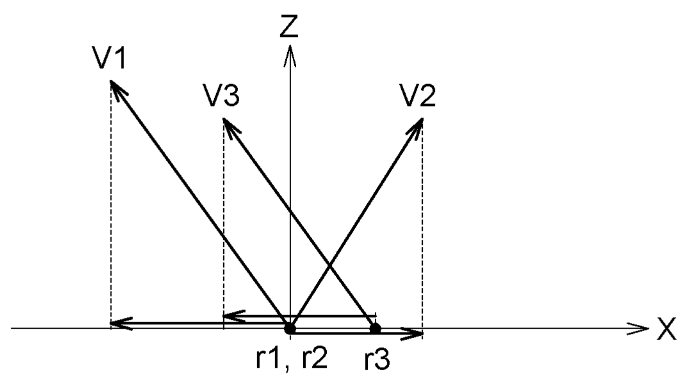
FIG. 11 shows a schematic diagram of the relative relationship of the first robotic arm, the second robotic arm and the third robotic arm according to another embodiment of the present disclosure.

Referring to FIG. 11, FIG. 11 shows a schematic diagram of the relative relationship of the first robotic arm, the second robotic arm and the third robotic arm according to another embodiment of the present disclosure. Taking the second robotic arm 120 (not shown in FIG. 11) as the "stopped one" for an example, the controller 130 determines the common coordinate system XYZ according to the origin r1 of the first robotic arm coordinate system x1-y1-z1 and the origin r2 of the second robotic arm coordinate system x2-y2-z2. If the controller 130 could not determine, in the XZ plane, the robotic arm which is selected to home, the controller 130 could reset the common coordinate system. For example, the controller 130 determines the common coordinate system XYZ according to the origin r2 of the second robotic arm coordinate system x2-y2-z2 and the origin r3 of the third robotic arm coordinate system x3-y3-z3, and then determines the reset path of the "controlled-to-moved one" and controls the "controlled-to-moved one" to home first using the aforementioned method.

In summary, the disclosed embodiment provides a collaborative robotic arm system and a homing method thereof. The collaborative robotic arm system includes a plurality of robotic arms and a controller, wherein the controller is configured to: (1) control all robotic arms to stop moving, wherein each robotic arms has a working vector; (2). determine whether any two of the projection vectors of the working vectors projected on a coordinate axis overlap each other; (3). when any two of the projection vectors overlap each other, control at least one controlled-to-moved one of the robotic arms to move along a reset path, wherein the reset path does not pass through the stopped one of the robotic arms, and the "stopped one" is one of the robotic arms, for example, the malfunction one or the collided one, and the "controlled-to-moved one" is the others or another of the robotic arms. In another embodiment, the controller is configured to: when it is difficult to determine, from a plane of the common coordinate system, the robotic arm that could be used as the "controlled-to-moved one", the controller could determine, in another plane of the same common coordinate system, the robotic arm that could be used as the "controlled-to-moved one" without resetting the common coordinate system. In another embodiment, the controller is configured to reset the common coordinate system after the "controlled-to-moved one" homes, and determine the reset path of the "controlled-to-moved one" under the reset common coordinate system. Through the aforementioned method, it is prevented the "controlled-to-moved one" occurs the collision during the homing process.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A homing method for a cooperative robotic arm system, comprising:

controlling a first robotic arm and a second robotic arm to stop moving, wherein the first robotic arm has a first working vector and the second robotic arm has a second working vector;

determining whether a first projection vector of the first working vector projected on a first coordinate axis and a second projection vector of the second working vector projected on the first coordinate axis overlap;

determining whether a third projection vector of the first working vector projected on a second coordinate axis and a fourth projection of the second working vector projected on the second coordinate axis overlap when the first projection vector and the second projection vector overlap; and controlling a first controlled-to-moved one of the first robotic arm and the second robotic arm to move along a first reset path when the third projection vector and the fourth projection vector do not overlap, wherein the first reset path does not pass through a working point of a stopped one of the first robotic arm and the second robotic arm.

2. The homing method according to claim 1, wherein the first reset path is parallel to the second coordinate axis or a third coordinate axis, and the third coordinate axis is perpendicular to the first coordinate axis and also perpendicular to the second coordinate axis.

3. The homing method according to claim 1, wherein the first coordinate axis is perpendicular to the second coordinate axis.

4. The homing method according to claim 1, wherein the first coordinate axis and the second coordinate axis are two axes of a common coordinate system.

5. The homing method according to claim 4, wherein the first working vector is referenced to a first robotic arm coordinate system, and an origin of the first robotic arm coordinate system coincides with an origin of the common coordinate system.

6. The homing method according to claim 1, wherein the first working vector is referenced to a first robotic arm coordinate system, and the second working vector is referenced to a second robotic arm coordinate system; the homing method further comprises:

defining a common coordinate system, wherein the first coordinate axis of the common coordinate system passes through an origin of the first robotic arm coordinate system and an origin of the second robotic arm coordinate system.

7. The homing method according to claim 1, wherein the first reset path is a path close to or away from the stopped one.

8. The homing method according to claim 1, further comprises:

controlling a third robotic arm to stop moving, wherein the third robotic arm has a third working vector;

determining whether any two of the first projection vector, the second projection vector and a fifth projection vector of the third working vector projected on the first coordinate axis overlap each other;

determining whether the third projection vector, the fourth projection vector and a sixth projection vector of the third working vector projected on the second coordinate axis overlap each other when any two of the first projection vector, the second projection vector and the fifth projection vector overlap each other; and controlling the first controlled-to-moved one of the controlled-to-moved one of the first robotic arm, the second robotic arm and the third robotic arm to move along the first reset path when the third projection vector, the fourth projection vector and the sixth projection vector do not overlap with each other, wherein the first reset path does not pass through the working point of the stopped one of the first robotic arm, the second robotic arm and the third robotic arm, and controlling a second controlled-to-moved one of the first robotic arm, the second robotic arm and the third robotic arm to move along a second reset path, wherein the second reset path does not pass through the working point of the stopped one.

9. The homing method according to claim 1, further comprises:

determining a common coordinate system by two of the first robotic arm, the second robotic arm and a third robotic arm;

after controlling the first controlled-to-moved one to move, determining a reset common coordinate system according to the other two of the first robotic arm, the second robotic arm and the third robotic arm, wherein the other two of the first robotic arm, the second robotic arm and the third robotic arm and the two of the first robotic arm, the second robotic arm and the third robotic arm are not completely same;

determining a second reset path of a second controlled-to-moved one of the other two of the first robotic arm, the second robotic arm and the third robotic arm under the reset common coordinate system; and controlling the second controlled-to-moved one to move along the second reset path.

10. A cooperative robotic arm system, comprises:

a first robotic arm having a first working vector;

a second robotic arm having a second working vector; and a controller configured to:

control the first robotic arm and the second robotic arm to stop moving;

determine whether a first projection vector of the first working vector projected on a first coordinate axis and a second projection vector of the second working vector projected on the first coordinate axis overlap;

determine whether a third projection vector of the first working vector projected on a second coordinate axis and a fourth projection of the second working vector projected on the second coordinate axis overlap when the first projection vector and the second projection vector overlap; and control a first controlled-to-moved one of the first robotic arm and the second robotic arm to move along a first reset path when the third projection vector and the fourth projection vector do not overlap, wherein the first reset path does not pass through a working point of a stopped one of the first robotic arm and the second robotic arm.

11. The cooperative robotic arm system according to claim 10, wherein the first reset path is parallel to the second coordinate axis or a third coordinate axis, and the third coordinate axis is perpendicular to the first coordinate axis and also perpendicular to the second coordinate axis.

12. The cooperative robotic arm system according to claim 10, wherein the first coordinate axis is perpendicular to the second coordinate axis.

13. The cooperative robotic arm system according to claim 10, wherein the first coordinate axis and the second coordinate axis are two axes of a common coordinate system.

14. The cooperative robotic arm system according to claim 13, wherein the first working vector is referenced to a first robotic arm coordinate system, and an origin of the first robotic arm coordinate system coincides with an origin of the common coordinate system.

15. The cooperative robotic arm system according to claim 10, wherein the first working vector is referenced to a first robotic arm coordinate system, and the second working vector is referenced to a second robotic arm coordinate system; the homing method further comprises:

defining a common coordinate system, wherein the first coordinate axis of the common coordinate system passes through an origin of the first robotic arm coordinate system and an origin of the second robotic arm coordinate system.

16. The cooperative robotic arm system according to claim 10, wherein the first reset path is a path close to or away from the stopped one.

17. The cooperative robotic arm system according to claim 10, wherein the controller is further configured to:

control a third robotic arm to stop moving, wherein the third robotic arm has a third working vector;

determine whether any two of the first projection vector, the second projection vector and a fifth projection vector of the third working vector projected on the first coordinate axis overlap each other;

determine whether the third projection vector, the fourth projection vector and a sixth projection vector of the third working vector projected on the second coordinate axis overlap each other when any two of the first projection vector, the second projection vector and the fifth projection vector overlap each other; and control the first controlled-to-moved one of the controlled-to-moved one of the first robotic arm, the second robotic arm and the third robotic arm to move along the first reset path when the third projection vector, the fourth projection vector and the sixth projection vector do not overlap with each other, wherein the first reset path does not pass through the working point of the stopped one of the first robotic arm, the second robotic arm and the third robotic arm, and controlling a second controlled-to-moved one of the first robotic arm, the second robotic arm and the third robotic arm to move along a second reset path, wherein the second reset path does not pass through the working point of the stopped one.

18. The cooperative robotic arm system according to claim 10, wherein the controller is further configured to:

determine a common coordinate system by two of the first robotic arm, the second robotic arm and a third robotic arm;

after controlling the first controlled-to-moved one to move, determine a reset common coordinate system according to other two of the first robotic arm, the second robotic arm and the third robotic arm, wherein the other two of the first robotic arm, the second robotic arm and the third robotic arm and the two of the first robotic arm, the second robotic arm and the third robotic arm are not completely same;

determine a second reset path of a second controlled-to-moved one of the other two of the first robotic arm, the second robotic arm and the third robotic arm under the reset common coordinate system; and control the second controlled-to-moved one to move along the second reset path.

* * * * *